Feb. 13, 1951 — R. S. COX — 2,541,209
UPPER HALF OF A SADDLE MOUNT
Filed Aug. 20, 1947 — 4 Sheets-Sheet 2
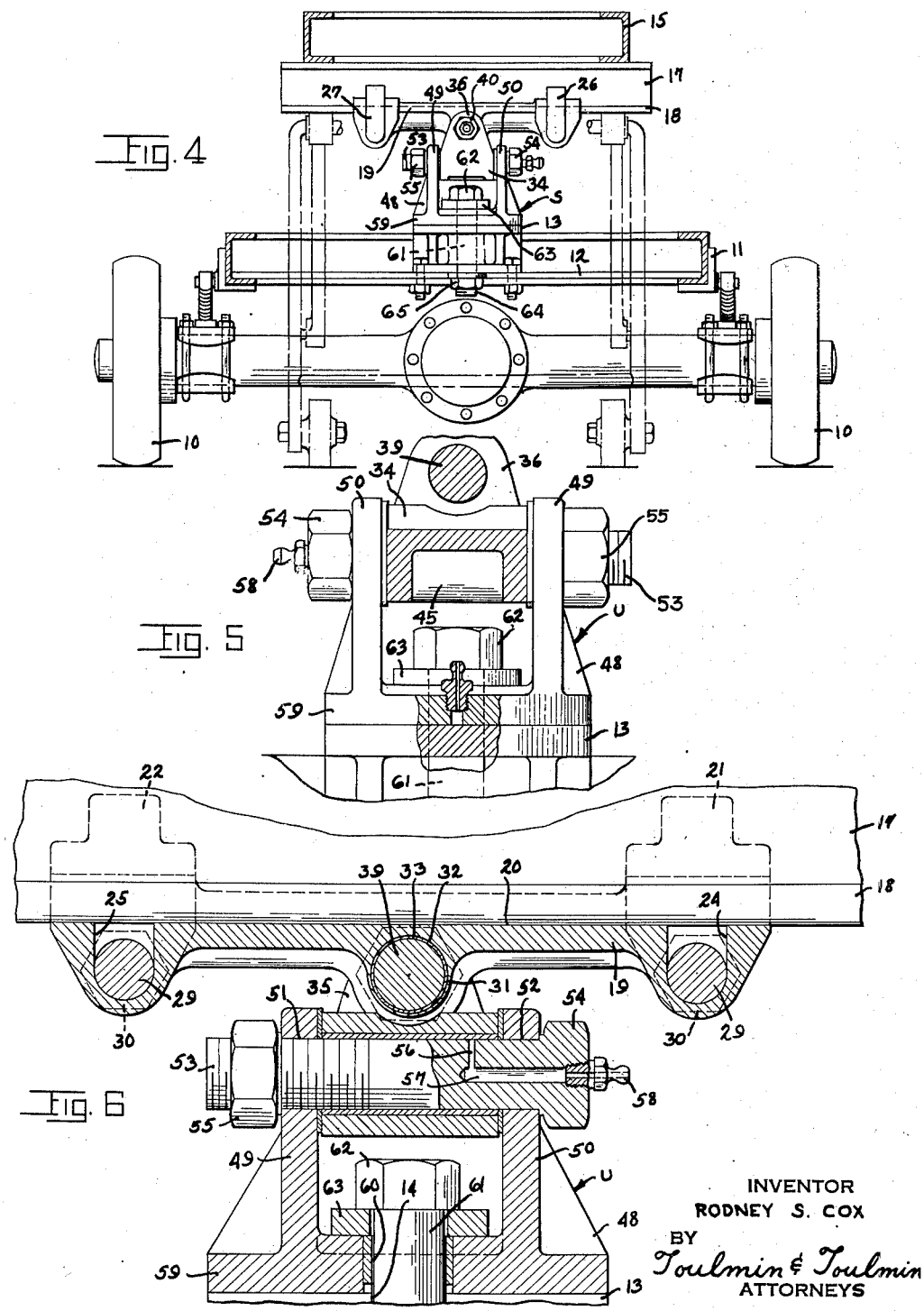
INVENTOR
RODNEY S. COX
BY
Toulmin & Toulmin
ATTORNEYS Feb. 13, 1951  R. S. COX  2,541,209
UPPER HALF OF A SADDLE MOUNT
Filed Aug. 20, 1947  4 Sheets—Sheet 3
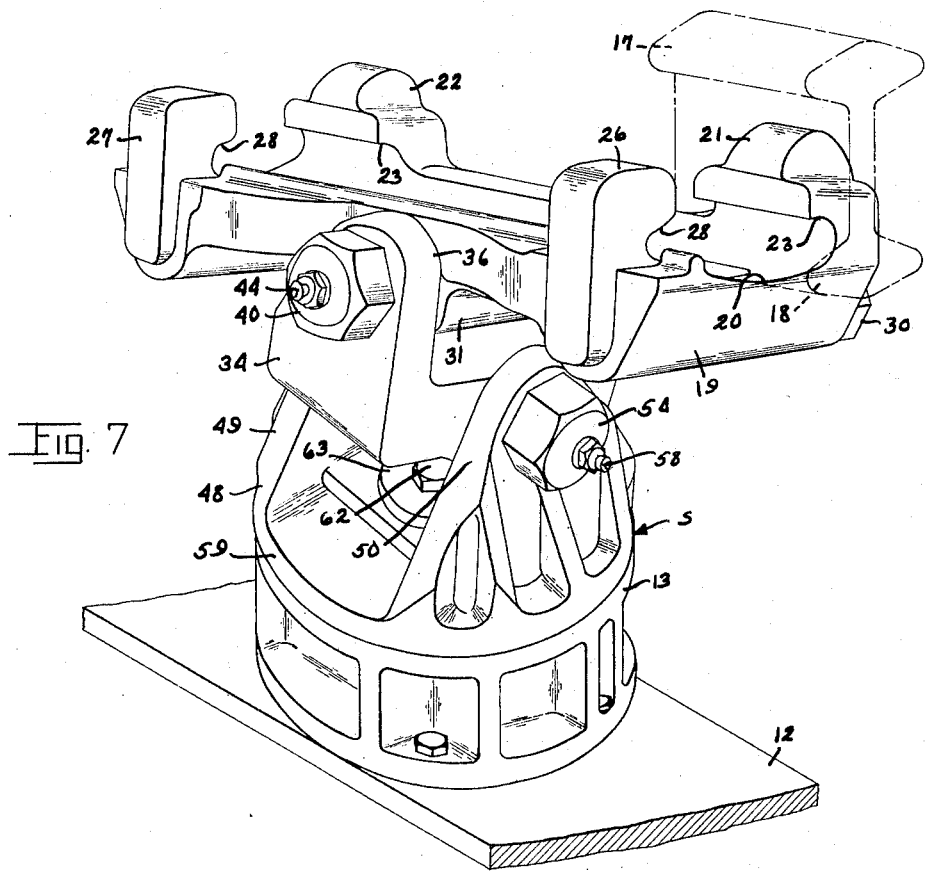
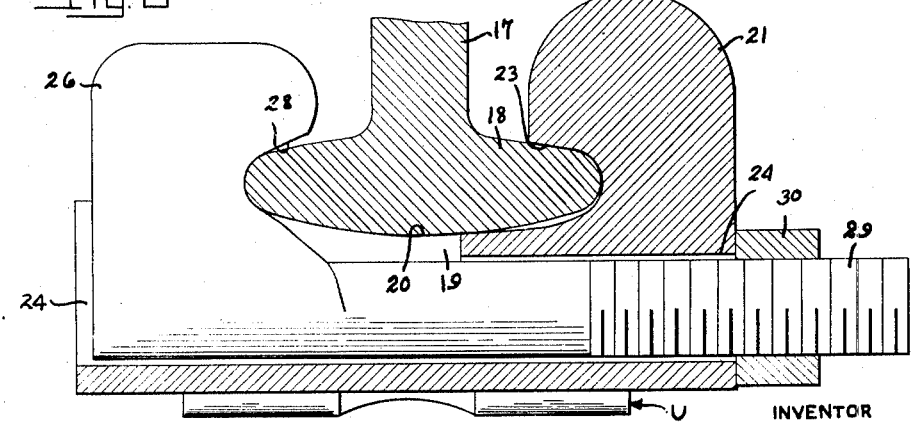
INVENTOR
RODNEY S. COX
BY
Toulmin & Toulmin
ATTORNEYS Feb. 13, 1951 R. S. COX 2,541,209
UPPER HALF OF A SADDLE MOUNT
Filed Aug. 20, 1947 4 Sheets-Sheet 4

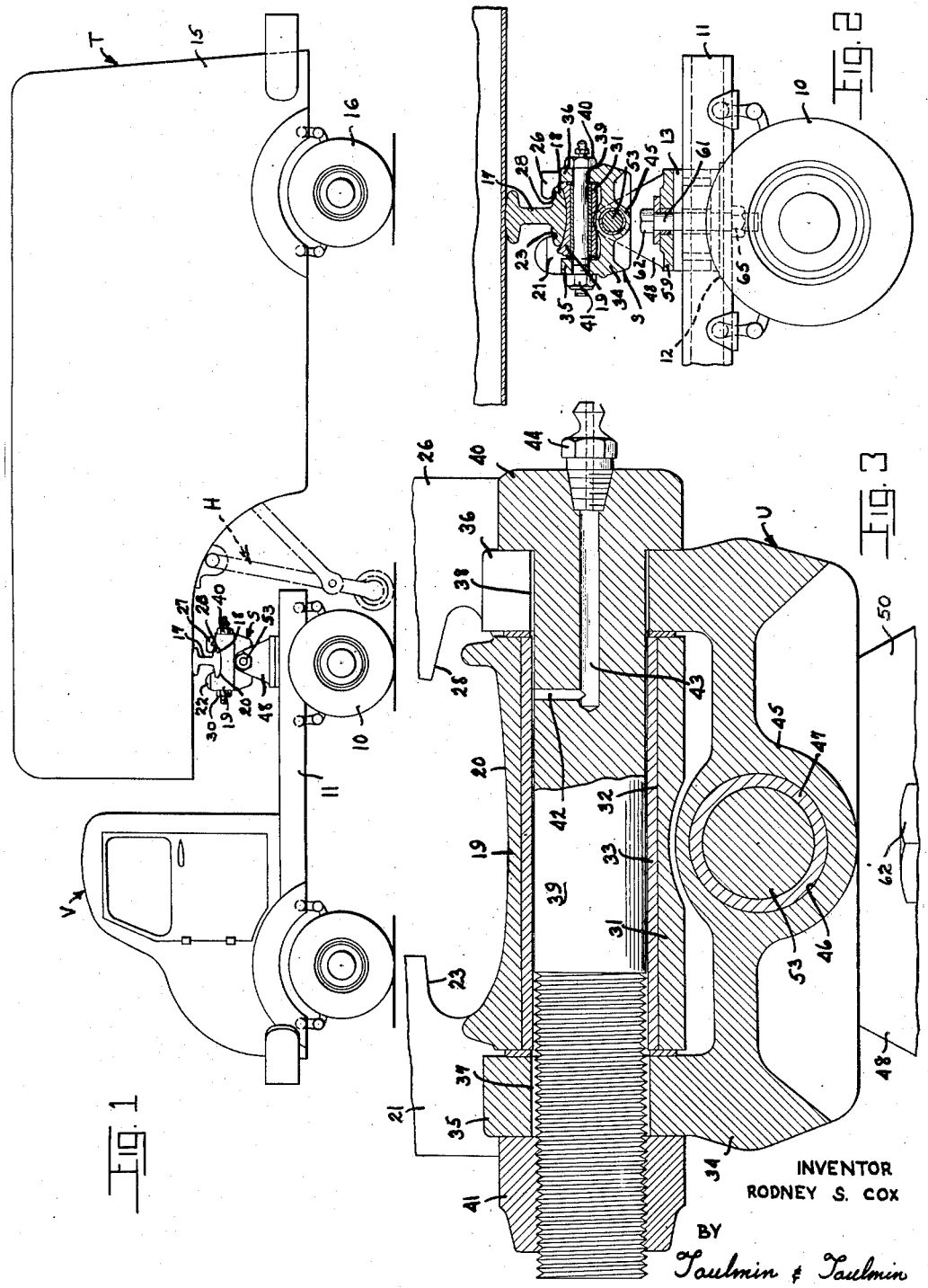

INVENTOR
RODNEY S. COX
BY
Toulmin & Toulmin
ATTORNEYS

Patented Feb. 13, 1951

2,541,209

UNITED STATES PATENT OFFICE 2,541,209

UPPER HALF OF A SADDLE MOUNT

Rodney S. Cox, Marion, Ohio

Application August 20, 1947, Serial No. 769,711

8 Claims. (Cl. 280—33.05)

The present invention deals with a so called "saddle mount" which is employed to establish the connection between a towed vehicle on one hand and a towing vehicle on the other and is concerned primarily with the upper half of such a saddle mount.

The use of the well known trailer truck is today becoming more and more widespread. A trailer truck consists essentially of a four wheel tug or towing vehicle and a trailer or towed vehicle having two wheels at the rear and which is mounted on the towing vehicle by a saddle mount. The practise of delivering truck chassis in "multiple" is also becoming equally widespread. In this practise one chassis functions as the towing vehicle. The front wheels of the other are removed and it is mounted on and connected to the first by a saddle mount of the type with which this invention is concerned.

In order to provide for relative movement between the towed and towing vehicles, whether they be the trailer and the truck or two truck chassis and which movement is an inevitable incident to normal driving operation, it is necessary that provision be made for such movement to take place on any or all of three axes. One of these axes is vertical and extends directly through the center of the saddle mount, which in turn, is located centrally of the towing vehicle. It is on this vertical axis that the trailer or towed chassis swings relative to the truck or towing chassis as in the making of turns.

The second axis provides for relative movement between the towed vehicle and the towing vehicle horizontally and substantially coincides with the longitudinal axis of the towed and towing vehicles. This axis permits so called rocking motion of the trailer or towed chassis relative to the truck or towing vehicle.

The third axis is also horizontal but is disposed normal to the longitudinal axis. It permits the rear end of the trailer or towed vehicle to rise and fall with respect to the truck or towing vehicle which action would be caused by uneven road surfaces.

In order to accommodate the saddle mount which establishes this connection between the forward end of the trailer and the truck, the front end of the trailer is usually recessed at the bottom. In the case of the truck chassis, the front wheels are removed from the towed chassis and the connection with the towing chassis established by a saddle mount. In either event, obviously, it is desirable to keep down to an absolute minimum the space which is required to accommodate a saddle mount. Accordingly, the invention has in view as one of its most important objectives, the position of a saddle mount, including an upper half which is highly compact and yet provides the above identified axes which are so essential to devices of this character. When this compact structure is achieved, all lever movements are held down to an absolute minimum and the necessary strength and rigidity obtained without making the saddle mount unduly heavy.

Under conditions of practical usage, it is common practice for an operator of a fleet of trailer trucks to have only one truck for several trailers. This means, that each trailer must be attached to and detached from the truck from time to time. Also, in the making of deliveries of truck chassis it is important that they be quickly and easily assembled and disassembled. With these conditions in mind, the invention has as another highly important object, the provision of a saddle mount of the character above indicated, which includes an upper half that is particularly adapted for quick and easy attachment to and detachment from the front transverse axle of the towed vehicle or trailer. This object is achieved by the particular arrangement of hook clamps and clamp support hereinafter described in detail.

In establishing the connection between the upper half of the saddle mount and the towed vehicle, it is important that the transverse axle on the towed vehicle be firmly engaged over an appreciable area by the clamps. A further somewhat more detailed object therefore, lies in the provision of a saddle mount including an upper half having hook clamps formed with a curved surface which cooperates with the axle with a cam action to force this axle on the towed vehicle into engagement with the clamp over an appreciable area with a surface to surface contact. This in effect, increases the strength of the clamp support by supplementing it with the strength of the axle.

In a saddle mount of the type with which this invention is concerned, it is of the utmost importance that the clamp support which carries the hook clamps has the properties of strength and rigidity to a high degree. Moreover, it is essential that one element of each set of clamps be movable, relative to the other and this condition is accommodated by channels or slots in which the hook clamps move.

Another important object of the invention is the provision of a saddle mount including an upper half of the type indicated, in which the slots or channels which accommodate the hook clamps are so formed as to enhance and increase the strength and rigidity of the clamp support.

Yet another object of the invention is to provide a saddle mount of the character aforesaid, which is highly simplified and which is readily adapted to the accommodation of towed vehicles of various sizes and shapes. This end is attained by the particular arrangement of elements hereinafter set forth.

In connecting a towed vehicle to the upper half of a saddle mount it is of course, necessary to first open up the hook clamps with respect to the clamp supports to facilitate insertion of the axle. The hook clamps are now tightened to establish the clamped relation.

An important object of the present invention is the provision of a saddle mount including an upper half of the type indicated, which employs hook clamps that are adjustable with respect to the clamp supports on a straight line adjustment. Such a straight line adjustment, affords maximum strength and places the clamps under direct tension.

Another object of the invention is the provision of a saddle mount including an upper half in which the clamp support materially contributes to and increases the strength of the hook clamps, due to the presence of an integral portion which engages and supports a substantial part of the bolt sections of the hook clamps and the clamps themselves. The engagement between this integral section of the clamp support and the hook clamps is beneath that length of the hook clamp which supports and secures the load and functions to prevent or rather resist any bending motion which is induced in the hook clamp by tightening of the clamp or braking the towed vehicle.

Still another object of the invention, is to provide, in the upper half of a saddle mount, an upper axle clamp support which is peculiarly adapted to engage the axle of a towed vehicle and provide for a more favorable weight distribution over the clamp support as well as maximum frictional contact which resists relative transverse movement between the axle and the clamp support.

Another somewhat more detailed object of the invention lies in the provision of an upper half of a saddle mount of the type indicated, in which the front clamps are formed integral with the clamp support. During certain of the driving operations, the front clamps are subject to the greatest stresses and strains, such as when the towed vehicle is braked and brought to a stop. Hence, it is these front clamps which are made integral with the clamp support.

When the forward end of a towed vehicle is hoisted into a position over a saddle mount and the engagement with the upper half is established, it is important, from the safety viewpoint, that the clamp support and the hook clamps be capable of holding the towed vehicle entirely aside from any assistance which may be offered by the hoist. Such a condition is achieved by the upper axle clamp support and the hook clamps of the present invention.

In order to adjust the hook clamp relative to the clamp support, each of the hook clamps carries a bolt section on which is threaded a nut.

Another somewhat more detailed object of the invention resides in the provision of an upper half of a saddle mount in which these nuts are conveniently located in an accessible position. This object is achieved by exposing the nuts in a direction facing to the front of the towed vehicle.

Various other more detailed objects and adjustments such as arise in connection with carrying out the above noted ideas in a practical embodiment will, in part become apparent, and in part be hereinafter stated as the description of the invention proceeds.

The invention, therefore comprises an upper half of a saddle mount which includes three axes for accommodating relative movements between towed and towing vehicles which are arranged in compact relation. New and improved mechanism is also provided for establishing a quickly detachable connection between the upper half of the saddle mount and the towed vehicle.

For a full and more complete understanding of the invention, reference may be had to the following description and accompanying drawings wherein;

Figure 1 is a side view of a trailer truck combination including a saddle mount having an upper half designed in accordance with the precepts of this invention.

Figure 2 is an enlarged detailed sectional view taken on a vertical longitudinal plane through the saddle mount.

Figure 3 is another sectional view taken on a still further enlarged scale and develops a vertical section through the clamp support where it receives one of the bolt sections of the hook clamps.

Figure 4 is a view in end elevation, looking at the rear of the towing vehicle.

Figure 5 is an enlarged detailed section through the universal joint of the saddle mount.

Figure 6 is a view looking from the front of the towed vehicle and showing the saddle mount, in transverse vertical section.

Figure 7 is a perspective of a saddle mount including an upper half design in accordance with the principles of this invention.

Figure 8 is an enlarged detailed section through one of the clamp sections; and

Figure 9:
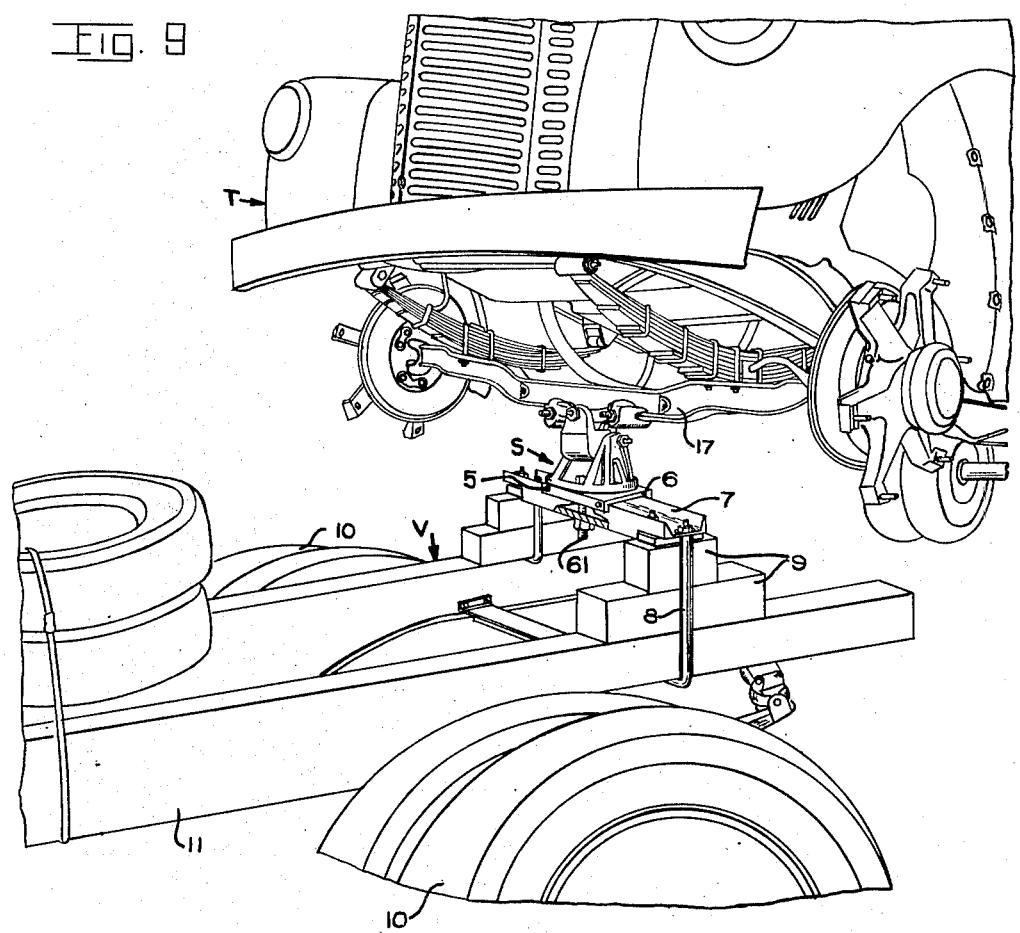
Figure 9 is a perspective showing the front end of a towed truck chassis as mounted on the rear end of a towing truck chassis by a saddle mount designed in accordance with the teachings of this invention.

Referring now to the drawing, wherein like reference characters denote corresponding parts, and first more particularly to Figure 1, a towing vehicle is identified in its entirety by the reference character V. The vehicle V, may be any of the conventional four wheel trucks commonly employed as a tug for towing purposes. The vehicle V may also take the form of a truck chassis as shown in Figure 9. The features of construction of the vehicle V, with which this invention is concerned, are the rear wheels 10 and the chassis 11. In the case of the trailer truck the chassis 11 carries a top plate 12. A saddle mount which is referred to in its entirety by the reference character S, is mounted on the plate 12, substantially in the center thereof, and directly over the axle carrying the rear wheels 10. The lower half of the saddle mount S, comprises a bearing member 13, which is formed with a vertical opening 14, that is adapted to receive a king-pin carried by the upper half as will be later described.

A towed vehicle is designated T, and may take the form of the usual trailer that is meeting with wide-spread use in the trucking field. Such a trailer is shown at T. The towed vehicle may also take the form of a truck chassis with the front wheels removed as shown in Figure 9 and designated T. The trailer T, comprises a main body 15, which is supported on rear wheels 16. The forward end of the body 15, is recessed at the bottom and mounted on the under face of this recessed portion is a transverse bar 17, which preferably is of the H cross section illustrated. This bar 17, includes a bottom flange 18, which is an important factor in establishing the connection with the upper half of the saddle mount. It is notable that the towed truck chassis T also includes a front axle corresponding to the bar 17 and of H cross section and having a bottom flange 18.

The upper half of the saddle mount S, is referred to generally as U. This upper half U, comprises an upper axle clamp support 19. The upper face of this support is curved as shown at 20 and it is the curved face which receives the lower flange 18 of the bar 17. The forward edge of the support 19, is formed with a pair of hook sections 21 and 22 which are integral therewith. It will be noted that each of these hook sections 21 and 22 includes a bill 23 that passes over the upper face of flange 18.

Substantially in alignment with the hook sections 21 and 22 are a pair of channel constructions 24 and 25 which are integral with the support 19. A pair of hook clamps are designated 26 and 27. Each of these hook clamps includes a bill 28 which is adapted to fit over the flange 18. Each hook clamp 26 and 27 also includes a bolt section 29, which is integral therewith, and which is received in one of the channels 24 and 25. The free ends of these bolt sections are threaded and each carry a nut 30, which may be employed to move the hook clamp relative to the respective hook section.

The lower face of the clamp support 19 is formed with a longitudinal extending boss 31, which is formed with a bore 32. This bore is provided with an anti-frictional lining 33.

A U shape connecting member 34, is formed with ears 35 and 36, which overlie the opposite ends of the boss 31. These ears are formed with passages 37 and 38 which align with the bore of the liner 33. A trunnion 39, which is headed at one end is shown at 40, and which carries a nut 41 at the other, passes through these aligned openings. As shown in Figure 3, the trunnion 39, may be provided with lubricating ducts 42 and 43 with the latter closed by a plug 44. The connecting member 34, is provided with a boss 45, which extends in a direction normal to the trunnion 39. This boss 45, is formed with a bore 46, which may be provided with a lining 47.

A second connecting member 48, which cooperates with the member 34 to provide a universal joint is formed with a pair of ears 49 and 50, overlying the ends of the boss 45. These ears 49 and 50, are formed with openings 51 and 52 which align with the bore of the lining 47. A trunnion 53, passes through these aligned openings. The trunnion 53, is headed as shown at 54, and carries a nut 55, on its threaded end. In order to lubricate the connection between the trunnion 53 and lining 47, the lubricating ducts 56 and 57 may be provided. The latter is closed by a plug 58.

The connecting member 48, includes a bottom bearing plate 59 of circular formation, and which engages the bearing member 13. This bearing plate is formed with a vertical opening 60, that aligns with the opening 14. A king-pin 61, passes through these aligned openings. As shown in Figures 4 and 6, this king-pin 61, has a head 62, which is separated from the plate 59 by a washer 63. The lower end of the king-pin is threaded as shown at 64 and carries a nut 65 that bears against the underface of the bearing member 13.

Whenever the trailer T is to be assembled or disassembled from the upper half of the saddle mount, a lifting hoist such as shown at H, in Figure 1, may be employed in accordance with common practice in the art. Any convenient crane or hoist may be employed to lift the towed chassis T of Figure 9.

When the arrangement of Figure 9 is used, blocks 9 are secured to the chassis 11 of the towing vehicle by V-shaped clamp 8. The open or free ends of the latter are anchored to a channel beam 7 while the bends are positioned beneath the side rails of the chassis. The lower half of the saddle mount S is carried by this beam 7 and may take the form of the plate 6 which is secured to the beam 7 by rivets shown at 5. The king-pin 61 passes through a central opening in this plate 6.

*Operation*

While the operation of the above described mechanism is believed to be obvious, it may be briefly outlined by noting that prior to positioning of the bar or axle 17, the hook clamps 26 and 27 are first spread apart relative to the hook sections 21 and 22. The lifting hoist H, or other hoist, is now availed over to position the bar or axle 17 on the support 19, with the flange 18 disposed between the hook sections 21 and 22 on the front, and the hook clamps 26 and 27 at the rear. The nuts 30, are now tightened to establish a tightly clamped condition. In this condition, the bills 23 and 28 overlie the upper face of the flange 18. It will be noted that during this operation, the curved surface 20 is forced down against the corresponding surface of the clamp support and thereby adds to the strength and rigidity thereof.

With the bar or axle 17, affixed to the upper half U in the manner described, the towing vehicle V is enabled to tow the trailer T or truck chassis T in the usual manner. Any turns such as are caused by directional purposes, are accommodated by the vertical king-pin 61. Any rocking or rolling action of the trailer T or towed chassis T relative to the truck V, is taken care of by the trunnion 39. At the same time, any movement of the rear wheels 16 of the trailer T, or chassis T up or down with respect to the vehicle V, is accomodated by the trunnion 53.

While preferred specific embodiments of the invention are hereinbefore set forth, it is to be clearly understood that the invention is not to be limited to the exact constructions illustrated and described, because various modifications of these details may be provided in putting the invention into practice within the purview of the appended claims.

What is claimed is:

1. In a saddle mount of the character described, an upper half comprising clamping means adapted to receive the axle of a towed vehicle, a clamp support carrying said clamping means, a universal joint connected to and supporting said clamp support, a rotating bearing member for support by the chassis of the towing vehicle, said bearing member supporting said universal joint, and a king-pin pivotally connecting said universal joint to said bearing member.

2. In an upper half of a saddle mount, a clamp support having an upper surface adapted to receive the axle of a vehicle to be towed, clamping means carried by said support and adapted to grip about the bottom flange of said axle, a boss formed on the under face of said clamp support in close proximity to said axle receiving surface, and a universal joint connected to said boss.

3. In combination, a towing vehicle, a saddle mount on said towing vehicle, said saddle mount including an upper half having a clamp support, a towed vehicle having an axle received in said clamp support, clamping means carried by said clamp support engaging the bottom flange of said axle, and means for adjusting said clamping means from in front of said towed vehicle.

4. In combination, a towing vehicle, a saddle mount on said towing vehicle, said saddle mount including an upper half having a clamp support, a towed vehicle having an axle received in said clamp support, clamping means carried by said clamp support engaging the bottom flange of said axle, bolts associated with said clamping means, and nuts on said bolts accessible from in front of said towed vehicle.

5. In an upper half of a saddle mount, a universal joint consisting of an upper part and a lower part and providing rotation on two horizontal axes normal to each other, clamping means adapted to receive the axle of a towed vehicle carried on said upper part, said lower part including a bearing part for support of the universal joint, and a king-pin connection means in said bearing part providing for rotation of said universal joint on a vertical axis.

6. In a saddle mount of the character described an upper support comprising clamping means adapted to receive and to hold the bar portion of a towed vehicle by contact with the lower flange of said bar, a clamp support carrying said clamping means, a universal joint connected to said clamp support, said universal joint being adapted with a trunnion joining together a connecting member and the clamping support, and a trunnion in normal position relative to said first trunnion and joining said first connecting member to a second connecting member, and a king-pin vertically positioned relative to the trunnions joining said second connecting member to a bearing member supported by the chassis of a towing vehicle.

7. In a saddle mount of the character described, clamping means adapted to receive the axle of a towed vehicle, a clamp support including a trunnion horizontally pivotally mounting said clamping means thereon, a second support supporting said clamp support and including a trunnion normal to the first trunnion horizontally pivotally mounting said clamp support on said second support, and means in said second support forming king-pin connecting means for vertical pivoting of said second support and thus said clamp support and clamping means therewith.

8. In a saddle mount of the character described, clamping means adapted to receive the axle of a towed vehicle, a clamp support including a trunnion horizontally pivotally mounting said clamping means thereon, a second support supporting said clamp support and including a trunnion normal to the first trunnion horizontally pivotally mounting said clamp support on said second support, a bearing member supporting said second support, and king-pin means connecting said second support with said bearing member for vertical pivoting of said second support on said bearing member.

RODNEY S. COX.

REFERENCES CITED

The following references are of record in the file of this patent:

UNITED STATES PATENTS

| Number | Name | Date |
|---|---|---|
| 1,334,113 | Norton | Mar. 16, 1920 |
| 1,694,278 | Nordgren | Dec. 4, 1928 |
| 1,845,611 | Loveridge | Feb. 16, 1932 |
| 2,152,279 | Randall et al. | Mar. 28, 1939 |
| 2,411,411 | Blair et al. | Nov. 19, 1946 |